(12) United States Patent
Drury

(10) Patent No.: US 6,694,663 B1
(45) Date of Patent: Feb. 24, 2004

(54) UNIVERSAL HAND PULL FOR SNAGGED LINES

(76) Inventor: Donald R. Drury, 963 Hackman Rd., St. Paul, MO (US) 63366

( * ) Notice: Subject to any disclaimer, the term of this patent is extended or adjusted under 35 U.S.C. 154(b) by 0 days.

(21) Appl. No.: 10/216,594

(22) Filed: Aug. 9, 2002

(51) Int. Cl.⁷ .............................................. A01K 97/24
(52) U.S. Cl. ....................................................... 43/17.2
(58) Field of Search ................................ 43/17.2, 4, 24, 43/43.15, 44.93, 5; 242/155 R; 294/25

(56) References Cited

U.S. PATENT DOCUMENTS

| | | |
|---|---|---|
| 78,546 A | 6/1868 | Stacy |
| 413,657 A * | 10/1889 | Gibbs ..................... 242/155 R |
| 450,555 A * | 4/1891 | Brown .................... 242/155 R |
| 1,851,370 A * | 3/1932 | Munger ....................... 43/17.2 |
| 2,556,189 A | 6/1951 | Johnson |
| 2,627,691 A | 2/1953 | Bress |
| 2,828,570 A | 4/1958 | Bradbury |
| 2,861,377 A | 11/1958 | Childress |
| 2,895,250 A | 7/1959 | Burden |
| 2,950,558 A | 8/1960 | Karpes |
| 3,061,967 A * | 11/1962 | Hill ............................. 43/17.2 |
| 4,712,324 A | 12/1987 | Padgett |
| 5,138,791 A * | 8/1992 | Coes ........................... 43/53.5 |
| 5,364,148 A | 11/1994 | Bartocci |
| 5,452,537 A | 9/1995 | Ellison |
| 5,615,509 A * | 4/1997 | Washington ................. 43/17.2 |
| 5,724,762 A * | 3/1998 | Thompson ................... 43/17.2 |

* cited by examiner

Primary Examiner—Charles T. Jordan
Assistant Examiner—John W. Zerr
(74) Attorney, Agent, or Firm—Polster, Lieder, Woodruff & Lucchesi, L.C.

(57) ABSTRACT

A floating hand held tool for engaging a snagged line and for applying force to a line without cutting the hand or arm of the user and without applying undue stress to the rod and reel of the user. The tool has a V-shaped groove in an outer circumferential rim for engaging the line and a center opening for gripping the tool by hand.

5 Claims, 3 Drawing Sheets

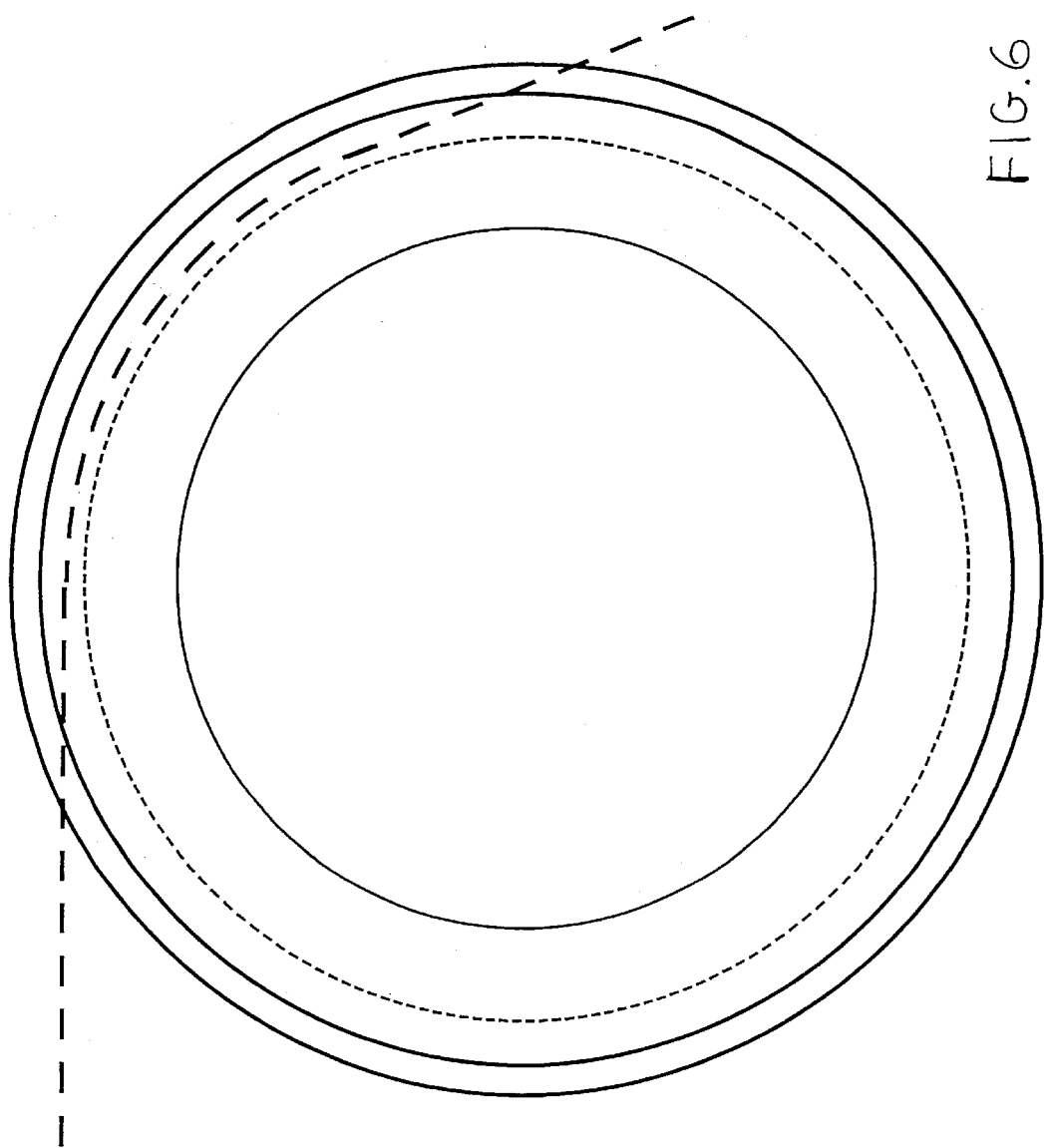

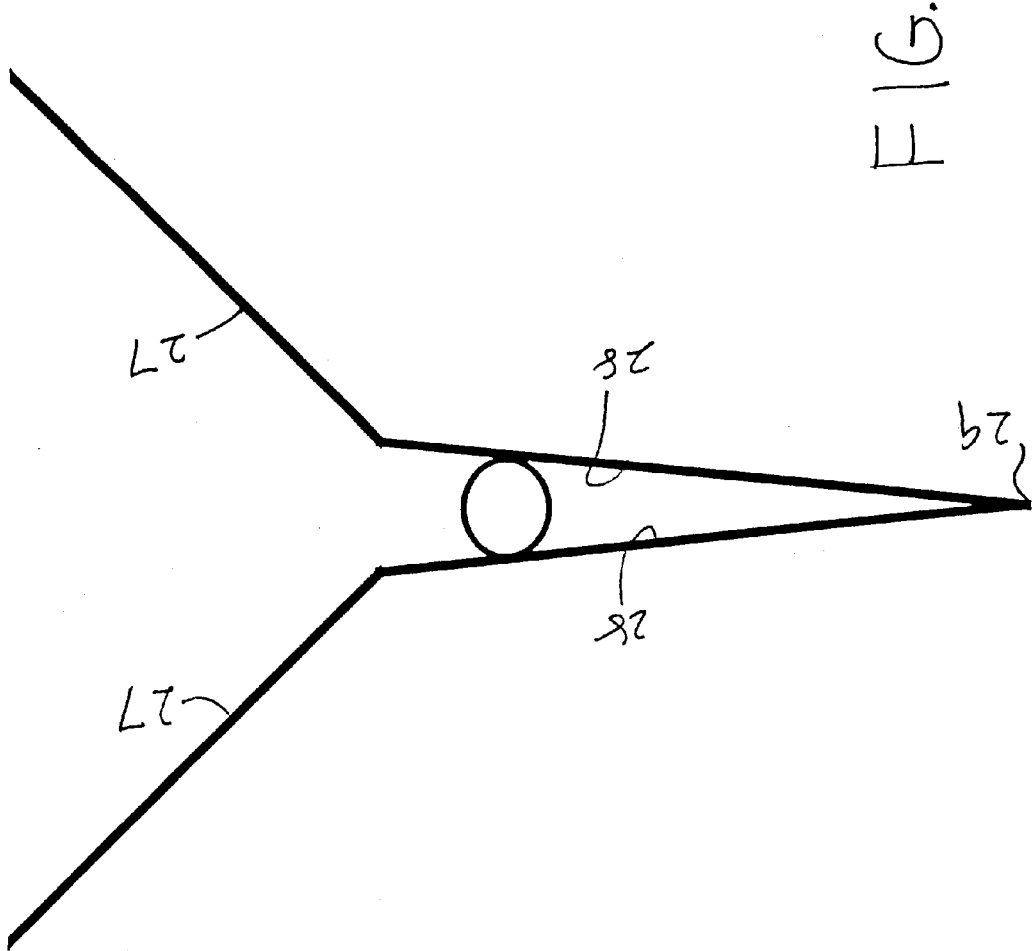

UNIVERSAL HAND PULL FOR SNAGGED LINES

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The invention is applicable to a device for use in disengaging snagged lines and specifically relates to a portable, hand held device which is adapted to engage a snagged fishing line to enable the one fishing to pull on the line without exerting undue force on the rod or the hands of the user.

There are many devices designed to disengage snagged lures.

Most of these devices are fed down an auxiliary line to engage the snagged lure at the point of its snagging. For example, see Ellison U.S. Pat. No. 5,452,537, Padgett U.S. Pat. No. 4,712,324, Karpes U.S. Pat. No. 2,950,558, Burden U.S. Pat. No. 2,895,250 and Bradbury U.S. Pat. No. 2,828,570. Childress U.S. Pat. No. 2,861,377 uses a bracket attached to the end of an oar to change the direction of pull on the line in an effort to disengage the snagged lure.

There also are devices designed to prevent cutting the hand of the user when the user is fishing with a hand line. Bress U.S. Pat. No. 2,627,691 shows a device which fits over the line and slides down the line and has a ball which will lock the line against the inside of the retriever to allow the line to be moved at a different angle without stress on the rod in an effort to free the snagged lure.

Johnson U.S. Pat. No. 2,556,189 shows a D-ring having a groove over which the line fits so that it acts as a hand guard to prevent the line from cutting the hand of the person fishing. This is designed to be used with hand held deep sea fishing lines. A 1868 patent to Stacy No. 78,546 also is designed to be used for hand fishing and shows a circular wheel with a groove in the center, but the wheel is made of flexible material so that when the two sides of the wheel rim are gripped, they move toward each other to engage the line.

The present invention is directed to a different problem in disengaging snagged lures than the aforesaid prior art patents address, because of advanced technology in fishing line construction.

The latest fishing lines have exceptional strength and elasticity and when a line is snagged, the one fishing has a difficult problem in exerting enough force by pulling on the line to either dislodge the line or break the line. Since fishing line primarily is a thin polymeric material, the line can cut the hands of the user if pulled with sufficient force. On the other hand if the rod is used to try to free or break the line, the line has sufficient strength to break the rod, usually near the butt end.

Another problem in mechanically gripping fishing line is that the lines of different strengths have different diameters.

Accordingly, it is a principal object of this invention to provide a hand pull for engaging snagged fishing line which will give the user sufficient leverage to free or break the line without subjecting the rod to excess force and without danger of the line cutting the hands of the user.

It is a further object of this invention to provide a universal hand pull for engaging snagged fishing lines of varying diameters.

It is still a further object of this invention to provide a hand pull for engaging snagged fishing lures which will float if it is accidentally dropped into the body of water in which the lure is snagged.

These and other objects and advantages will become apparent hereinafter.

BRIEF SUMMARY OF THE INVENTION

The invention comprises a floating universal hand hold for engaging snagged fishing of different diameters so that the line can be pulled and force exerted on the lure and the line without danger to the rod or the hands of the user.

BRIEF DESCRIPTION OF THE SEVERAL VIEWS OF THE DRAWINGS

In the drawings wherein like numbers refer to like parts whenever they occur:

FIG. 6 is a side elevational view of the tool with a line engaged in it; and; and FIG. 7 is an enlarged fragmentary sectional view of the line engaged in the tool.

Corresponding reference numerals will be used to refer to like parts throughout the several figures of the drawings.

DETAILED DESCRIPTION OF THE INVENTION

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention.

Figure 1:
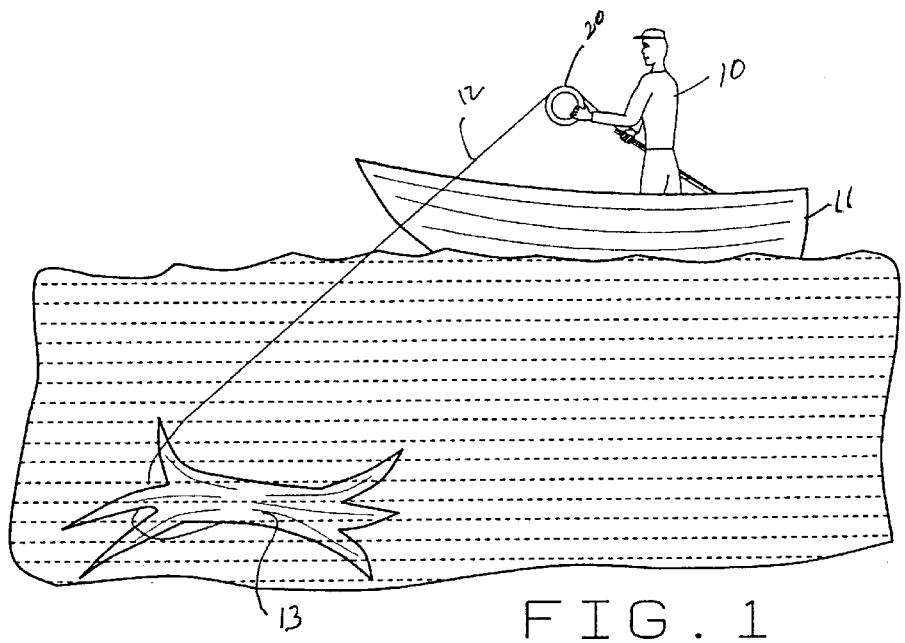
FIG. 1 is a fragmentary view showing the tool in use.
Figure 2:
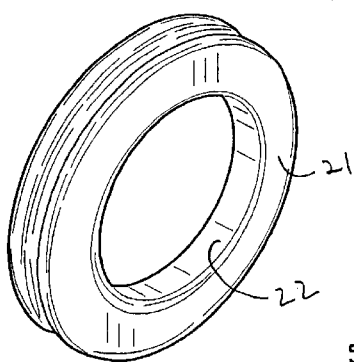
FIG. 2 is a perspective view of the tool.

FIG. 1 shows a user 10 in a boat 11 with his fishing line 12 in a snag 13. Rather than trying to loosen or break the line or straighten the hook by pulling on the line using the rod or his hands, the user 10 uses the tool 20 of this invention.

Figure 4:
FIG. 4 is an end elevational view of the tool.
Figure 5:
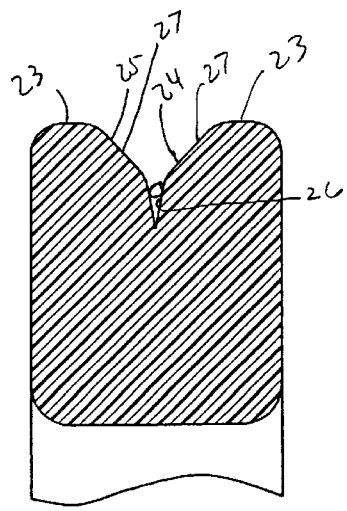
FIG. 5 is a sectional view taken along line 5—5 of FIG. 4.
Figure 3:
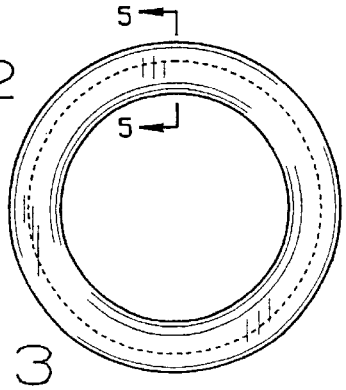
FIG. 3 is a side elevational view of the tool.

The tool 20 is shown in more detail in FIGS. 3–5 and comprises an annular body 21 having a center opening 22. The opening 22 allows the hand of a user to grip the body 21 firmly.

The body 21 has a circumferential rim outer surface which is defined by a pair of side-by-side cylindrical surfaces 23 with a groove 24 therebetween. The groove 24 is formed by a pair of intersecting radially disposed V-shaped cutouts 25,26. The outer most V-shaped cut has an open top and sides 27 which taper toward each other. The sides 27 never meet, but terminate when the inner most V-shaped cut 26 begins. The innermost cut 26 has an open top which also is the open bottom of the outermost cut 25. The innermost cut 26 is further defined by converging sides 28 which join at an apex 29.

The area between the sides 28 trap and retain the polymeric line 12 when the line 12 is applied to the tool 20. The line 12 is applied over a large segment of the tool 20 (FIG. 6) and as force is applied to the line 12, it is forced deeper into the innermost groove 26, thus increasing the gripping force on the line 12.

Since the innermost groove 26 has tapering converging sizes, it will accommodate different diameters of line 12.

Also the harder the line 12 is pulled, the greater the force on the line 12 and the deeper it goes in the innermost groove 26.

In operation, after the user determines the fish lure is engaged in a snagged location, he will position a portion of the fish line 12 between the rod and the line in the V-shaped groove 26 of the tool 20 to grip the line 12 in the groove 26. He will then hold the tool 20 in one hand and exert tension on the line 12 by pulling on the tool 20 away from the snagged end of the line 12. To move the tool 20 down the line 12 toward the snagged end, the user grasps the line 12 with his free hand between the tool 20 and the rod and uses his other hand to turn and rotate the tool 20 down the line 12 toward the snag. To reassert force on the line 12, the tool 20 then is pulled back away from the snag. This forces the line 12 back into the groove 26 so the line 12 can be stretched more. When the tool 20 is rolled toward the snag, the line 12 is freed from the groove 26 enough to be moved down the line 12 a sufficient distance to allow additional force to be exerted on the line 12 when the tool 20 is again pulled away from the snagged end of the line 12. This process is repeated until the line 12 is broken or the line 12 is freed from the snag. In other words, when the tool 20 is pulled away from the snagged end of the line 12, it engages the line 12 such that further pull on the tool 20 stretches and applies tension to the line 12. However, when the tool 20 is rotated down the line 12 toward the snagged end, the line is temporarily freed and the tension is maintained by the user's free hand on the line 12. After the tool 20 has been applied to the line 12, pulling on the tool 20 increases tension and stretch on the line 12.

By using this tool 20, the user does not chance cutting his hands or arms and does not stress his rod or the gears of his reel. Another advantage is that the tool 20 can be used to retrieve an object that is too heavy for the rod, but not heavy enough to break the line, such as a tire, boot filled with debris, etc.

The tool 20 is of a floating type polymer so it can be retrieved if it should inadvertently be dropped into the water.

In view of the above, it will be seen that the several objects and advantages of the present invention have been achieved and other advantageous results have been obtained.

As various changes could be made in the above constructions without departing from the scope of the invention, it is intended that all matter contained in the above description or shown in the accompanying drawings shall be interpreted as illustrative and not in a limiting sense.

What is claimed is:

1. A rigid tool for pulling snagged fishing line comprising:
   a) a monolithic annular body having an open center and a circular rim, the rim having a width and depth easily grasped by the human hand, the rim having inner and outer surfaces and connecting side surfaces;
   b) the inner surface of the rim being a cylindrical surface;
   c) the outer surface being defined by a pair of spaced cylindrical surfaces with a groove therebetween;
   d) the groove being formed by a pair of intersecting radially disposed innermost and outermost V-shaped cuts;
      1) the outermost V-shaped cut having an open top and open bottom and sides which taper toward each other; and
      (2) the innermost V-shaped cut having an open top which intersects the sides of the outermost V-shaped cut before they intersect to define the open bottom for the outermost V-shaped cut, and sides which converge to a point to define a tapered line engaging area which will grip and retain lines of different diameters.

2. The tool of claim 1 wherein the tool will float in water.

3. The tool of claim 1 wherein the rim sides and inner and outer surfaces join in curved surfaces to facilitate gripping the tool.

4. The tool of claim 1 wherein the groove is formed by a pair of radially aligned V-shaped cuts with the outermost cut being truncated and wider at the top than at the bottom and having sides with a lesser angle to the horizontal than the innermost V-shaped cut whereby the truncated bottom of the outer cutout forms the open top of the innermost cut.

5. A method of detaching a fish lure which is attached to one end of a fish line where the other end is attached to a reel on a fish rod from a snagged location comprising the steps of
   a) determining the fish lure is engaged in a snagged location,
   b) positioning a portion of the fish line between the rod and the lure in a V-shaped groove of a hand held device,
   c) gripping the line in the groove,
   d) holding the device in one hand,
   e) exerting tension on the line by moving the device away from the snagged end of the line,
   f) rolling the device down the line toward the snagged end while holding the line with the other hand, and
   g) repeating steps c), d), e) and f) until the line is broken or the lure freed from the snag.

* * * * *